Patented Apr. 8, 1947

2,418,708

UNITED STATES PATENT OFFICE 2,418,708

2-ACETOXY-4-METHYL-1,3-PENTADIENE

Bernard H. Gwynn, Oakmont, Pa., and Edward F. Degering, West Lafayette, Ind., assignors to Purdue Research Foundation, La Fayette, Ind., a corporation of Indiana No Drawing. Original application September 23, 1942, Serial No. 459,448. Divided and this application August 23, 1945, Serial No. 612,314

1 Claim. (Cl. 260—488)

This invention relates to 2-acetoxy-4-methyl-1,3-pentadiene. This application is a division of our copending application Serial No. 459,448, filed September 23, 1942 (now U. S. Patent 2,383,965, dated September 4, 1945).

In our copending application we have shown that ketones, such as mesityl oxide (isobutenyl methyl ketone), react with ketene in the presence of an acid catalyst to produce enol acetates. In the case of mesityl oxide, 2-acetoxy-4-methyl-1,3-pentadiene is formed. This compound is useful as an intermediate in the preparation of other organic compounds, e. g. the compound can be brominated or chlorinated to give polybromo and polychloro compounds.

It is, accordingly, an object of our invention to provide 2-acetoxy-4-methyl-1,3-pentadiene.

The following example will serve to illustrate further 2-acetoxy-4-methyl-1,3-pentadiene.

Example

Ketene prepared by pyrolysis of acetone was passed through two cold traps, the first being surrounded by an ice bath, and the second by a dry carbon tetrachloride-chloroform bath kept at −35° C. to −40° C., to remove acetone from the pyrolysis gas. The acetone-free ketene was then passed through a constantly agitated mixture consisting of approximately 6000 parts by weight of mesityl oxide and about 15 parts by weight of sulfuric acid contained in a reaction vessel immersed in an oil bath at a temperature of 75° C., the rate of flow of ketene being approximately 1100 parts by weight per hour. After 3½ hours, the flow of ketene was stopped, and the product separated from the reaction mixture by fractional distillation. 2-acetoxy-4-methyl-1,3 - pentadiene boiling at 57.5° C. at 10 mm. of Hg pressure was obtained. The acetoxy-4-methyl-1,3-pentadiene had a density ($d$ 25°/20°) of 0.9250 and a refractive index ($n$ 20/D) of 1.4611. It has the following formula:

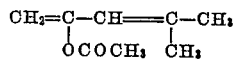

What we claim as our invention and desire to be secured by Letters Patent of the United States is:

2-acetoxy-4-methyl-1,3-pentadiene.

BERNARD H. GWYNN.
EDWARD F. DEGERING.

REFERENCES CITED

The following references are of record in the file of this patent:

UNITED STATES PATENTS

| Number | Name | Date |
| --- | --- | --- |
| 2,339,126 | Wolfram et al. | Jan. 11, 1944 |
| 2,073,363 | Carothers et al. | Mar. 9, 1937 |
| 2,042,221 | Groll et al. | May 26, 1936 |